United States Patent
Icore et al.

(10) Patent No.: US 11,019,047 B2
(45) Date of Patent: May 25, 2021

(54) CREDENTIAL LOSS PREVENTION

(71) Applicant: Microsoft Technology Licensing, LLC, Redmond, WA (US)

(72) Inventors: Michael Icore, Redmond, WA (US); Steven John Faehl, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 16/407,641

(22) Filed: May 9, 2019

(65) Prior Publication Data

US 2020/0252383 A1 Aug. 6, 2020

Related U.S. Application Data

(60) Provisional application No. 62/800,368, filed on Feb. 1, 2019.

(51) Int. Cl.
H04L 29/06 (2006.01)

(52) U.S. Cl.
CPC ............ H04L 63/08 (2013.01); H04L 63/102 (2013.01)

(58) Field of Classification Search
CPC ......... H04L 63/08; H04L 63/102; H04L 9/32; G06F 21/30; G06F 21/31; G06F 21/44; G06F 21/00; G06F 21/62
See application file for complete search history.

(56) References Cited

U.S. PATENT DOCUMENTS

| | | | |
|---|---|---|---|
| 8,607,322 B2 | 12/2013 | Hinton et al. | |
| 8,689,287 B2 | 4/2014 | Bohmer et al. | |
| 8,701,165 B2 | 4/2014 | Krivosheev et al. | |
| 2006/0218628 A1 | 9/2006 | Hinton et al. | |
| 2008/0141357 A1 | 6/2008 | Deligne et al. | |
| 2010/0313248 A1* | 12/2010 | Krivosheev | G06F 21/6263 726/5 |
| 2014/0040628 A1* | 2/2014 | Fort | G09C 5/00 713/182 |

(Continued)

FOREIGN PATENT DOCUMENTS

EP 695985 A1 2/1996

OTHER PUBLICATIONS

"Customizing Client Logon and Home Realm Discovery Pages", Retrieved from: https://docs.microsoft.com/en-us/previous-versions/windows/desktop/legacy/bb625464(v=vs.85)?redirectedfrom=MSDN, Oct. 19, 2016, 13 Pages.

(Continued)

*Primary Examiner* — Joseph P Hirl
*Assistant Examiner* — Ka Shan Choy
(74) *Attorney, Agent, or Firm* — Schwegman Lundberg & Woessner, P.A.

(57) ABSTRACT

Disclosed are methods and systems for credential protection. In one aspect, a method includes receiving an authentication credential and an authentication domain. A determination is made as to whether the authentication domain is permitted or unpermitted for authentication by the credential. If the domain is unpermitted, a data store is searched to identify a permitted domain for the credential. The credential is compared against credentials information associated with the domain to determine if it matches any of the associated credentials. If a match is found, an event is instantiated for the account.

20 Claims, 10 Drawing Sheets

(56) References Cited

U.S. PATENT DOCUMENTS

2014/0123264 A1    5/2014  Shull et al.
2017/0295166 A1*  10/2017  Guo ........................ G06F 21/41
2018/0004931 A1*   1/2018  Kounavis ................ G06F 21/44

OTHER PUBLICATIONS

Mathers, et al., "Home Realm Discovery Customization", Retrieved from: https://docs.microsoft.com/en-us/windows-server/identity/ad-fs/operations/home-realm-discovery-customization, May 31, 2017, 3 Pages.

"International Search Report and Written Opinion Issued in PCT Application No. PCT/US20/14860", dated Apr. 16, 2020, 26 Pages.

* cited by examiner

CREDENTIAL LOSS PREVENTION

CROSS REFERENCE TO RELATED APPLICATIONS

This application claims priority to U.S. Provisional Patent Application No. 62/800,368 filed Feb. 1, 2019 and entitled "CREDENTIAL LOSS PREVENTION." The contents of this prior application are considered part of this application and are hereby incorporated by reference in their entirety.

BACKGROUND

A user may establish a user account to be used to access one or more network services or resources (collectively, "account network resources') within an account network. In support of this scenario, an account authority service (e.g., an "identity provider" or a "security authority') provides a shared identity function that authenticates a single set of credentials to allow the user to access these account network resources. For example, by setting up an account with an account authority service, a user can configure a single set of credentials that can be used to access an email service, a calendaring service, an instant messaging service, a text messaging service, a blogging service, an online music service, a photo sharing service, various e-commerce site, various remote devices, etc. within the account network. The term "account network" generally refers to the network of account network resources that have trust relationships with an account authority service. In this context, a federated security architecture facilitates the use of a single set of credentials by providing mechanisms that enable authentication and authorization across different account networks. A federation is a collection of account authorities that have established trust among them. A realm corresponds to the smallest unit in a federation and represents a single unit of security administration or trust, such as a single organization. An account authority may support multiple realms. One of the simpler forms of a realm is a domain that represents an organization (e.g., CompanyxYZ.com).

The levels of trust may vary but actions of a realm typically include authentication and almost always include authorization. A typical federation, for example, might include a number of organizations that have established trust for shared access to a set of resources. Federated Security enables collaboration across multiple systems, networks, and organizations in different trust realms.

Typically, a user can sign into their appropriate account authority service (e.g., in their "home" realm) and receive a security token that can be used to access a desired network service. Furthermore, if the desired network service is in a different realm in the federation than the account authority service, the account authority service in one realm can send the appropriate security token for use in accessing the desired network service in the other realm, if the two realms have established a trust relationship.

While federated security offers numerous advantages, it also presents some risks in that it may provide for a larger number of diverse computing resources to be made available to a user via a single set of authentication credentials. If a nefarious user were able to obtain these credentials, each of this large number of resources may be put at risk of compromise. Thus, improved methods of protecting account credentials are desired.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
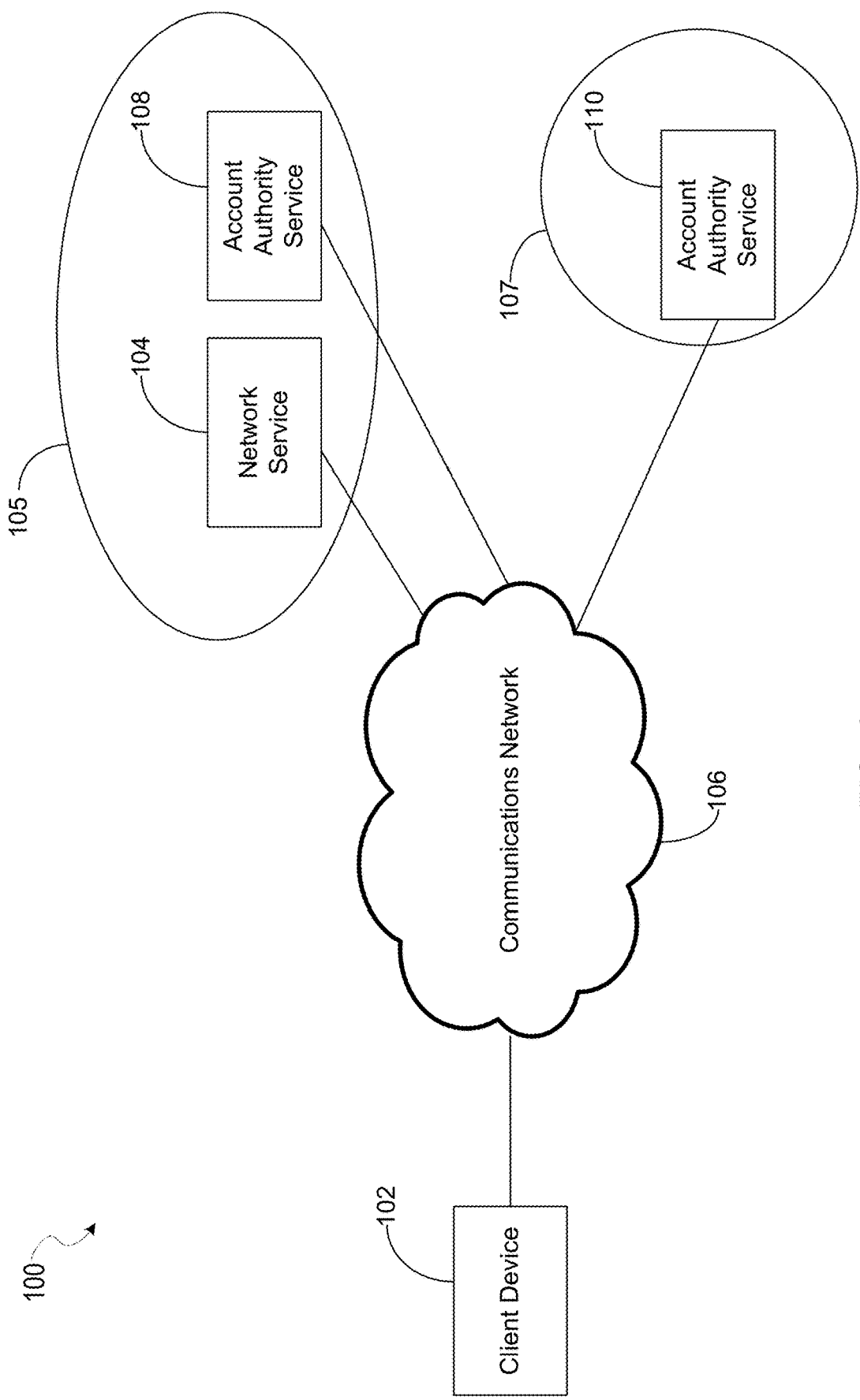
FIG. 1 illustrates an example system employing federated network security in one or more of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, while federated network security provides many user advantages, it does present a risk that a large number of computing resources may be placed at risk if the authentication credentials are compromised. To solve this technical problem, the disclosed embodiments present a technical solution that monitors authentication credentials supplied when logging into an authentication authority. If the login occurs to an authentication authority that is under the control of a known and trusted enterprise, no further action is taken.

If the authentication is against an authority that is not trusted, the disclosed embodiments then determine whether the authentication credentials provided to the non-trusted authority are valid to provide access to resources protected by a trusted authority within the enterprise. If the authentication credentials provided to the non-trusted authority offer no access to enterprise resources when used against a trusted authority, the authentication credential represents no risk to the enterprise's resources and monitoring of this particular authentication is complete. In the alternative, if the credentials provided to the non-trusted authority also function to provide access to enterprise resources via a trusted authentication authority (e.g. via a valid combination of account name and password), a remediation of an account identified by the credentials is performed. In some aspects, an account identified by the credentials may be disabled to prevent the credentials supplied to the non-trusted authority from being used by a nefarious actor to obtain access to enterprise resources. Alternatively, an alert or event may be instantiated to alert the account and/or another administrative account of the risk.

In some embodiments, the disclosed methods and systems operate in parallel with an account authentication or login process. Thus, in these aspects, the login process is allowed to proceed and potentially complete while the authentication domain and authentication credential are analyzed. Thus, a session or login may be established using the authentication credentials, or at least transmitted to a destination site, before the authentication credential(s) are completely analyzed and determined to represent a security risk.

This design avoids delaying the account authentication process while the authentication domain and authentication credentials are analyzed. If these embodiments determine that a risk is imposed by the authentication, remedial measures may be taken. In other words, in these embodiments, because the account authentication is allowed to proceed, corrective action to mitigate any potential damage caused by the authentication process, which was allowed to proceed, may be taken, as described above.

Of further note is that the disclosed embodiments generally avoid taking remedial action when an authentication credential provided during an authentication attempt does not represent a risk to a managed enterprise organization. For example, if an account authentication process presents authentication credentials that do not match any authentication credentials of any accounts managed by the disclosed embodiments, then no action may be taken with respect to use of those authentication credentials for an unauthenticated or even known malicious domain. In other words, the disclosed embodiments allow users to authenticate against unknown or even untrusted domains, dependent on the authentication credential being distinct and separate from any authentication credentials operative to access computing resources of the managed enterprise.

Some credentials analyzed by the disclosed embodiments may present an inherent risk of use within an enterprise, as they may be present within a set of well-known credentials that have previously been compromised. For example, sets of well-known credentials are readily available for sale via the dark web. These sets of well-known credentials may be purchased by nefarious actors and used to program automated bots that attempt to obtain unauthorized access to a variety of different web sites using the purchased well-known credentials. Thus, enterprise accounts using such credentials present a higher risk of nefarious access than enterprise accounts using more unique or unknown sets of credentials.

In contrast to these well-known compromised credentials, the disclosed embodiments may verify an authentication credential against a different list of authentication credentials. This different list of credentials is for a finite set of trusted domains within an enterprise being managed. Each credential in this different list of credentials may provide access to resources of the trusted domains and/or enterprise being managed.

While some embodiments may perform a separate process to ensure that a managed enterprise's authentication credentials are not present on any of the well-known lists of credentials discussed above, this type of authentication security is separate and distinct from the embodiments contemplated here, which compare an authentication credential to the different set of credentials for a set of trusted domains. As discussed above, this different set of credentials provide access to resources within a managed enterprise. In contrast, the globally available sets of well-known credentials are separate and distinct from this other set of credentials, and generally do not provide access to these enterprise resources.

FIG. 1 illustrates an example system 100 employing federated network security. A client device 102 may be operated to access a network service 104 via a communications network 106. The network service 104 resides within a realm 105 which is the same realm in which an account authority service 108 resides. The account authority service 108 provides authentication functionality for the network service 104. For example, the network service 104 may represent an email service that has a trust relationship established with the account authority service 108. As such, a login to the account authority service 108 obtains a security token that can be used to access the network service 104.

In the illustrated example, the client device 102 does not have an account with the account authority service 108 but instead has an account with the account authority service 110. The account authority service 110 resides in a different realm 107 that is a member of a federation with the realm 105. In this circumstance, the realm 107 of the account authority service 110 is considered the account's home realm, and the realm 105 of the account authority service 108 is considered a non-home realm within the federation. In should be understood that both realms are members of the same federation and can include other network services (not shown) within them. Further, for the account described with respect to FIG. 1, the account authority service 110 is considered a home security authority, whereas the account authority service 108 is considered a non-home security authority within the federation.

In a federated security environment, an account logging into the account authority service 110 receives a security token from the account authority service 110. The security token may be used to access the network service 104 (e.g. by obtaining the security token of the account authority service 110 translated into a security token accepted by the network service 104 of the account authority service 108).

The system 100 of FIG. 1 is configured as a multi-site authentication system, in that the network service 104 uses a separate account authority service 108 in realm 105 to perform its authentication. In other configurations, a system may be configured as a single-site authentication system, in that the account authority service 108 is integrated with the network service. In this case, no redirection to a network service's account authority service is required because both services reside or are accessible from the same URL. Note, however, that an account may still be redirected later to an account authority service of the account's home realm so that it can be authenticated within the federation employing the account's home realm.

Figure 2:
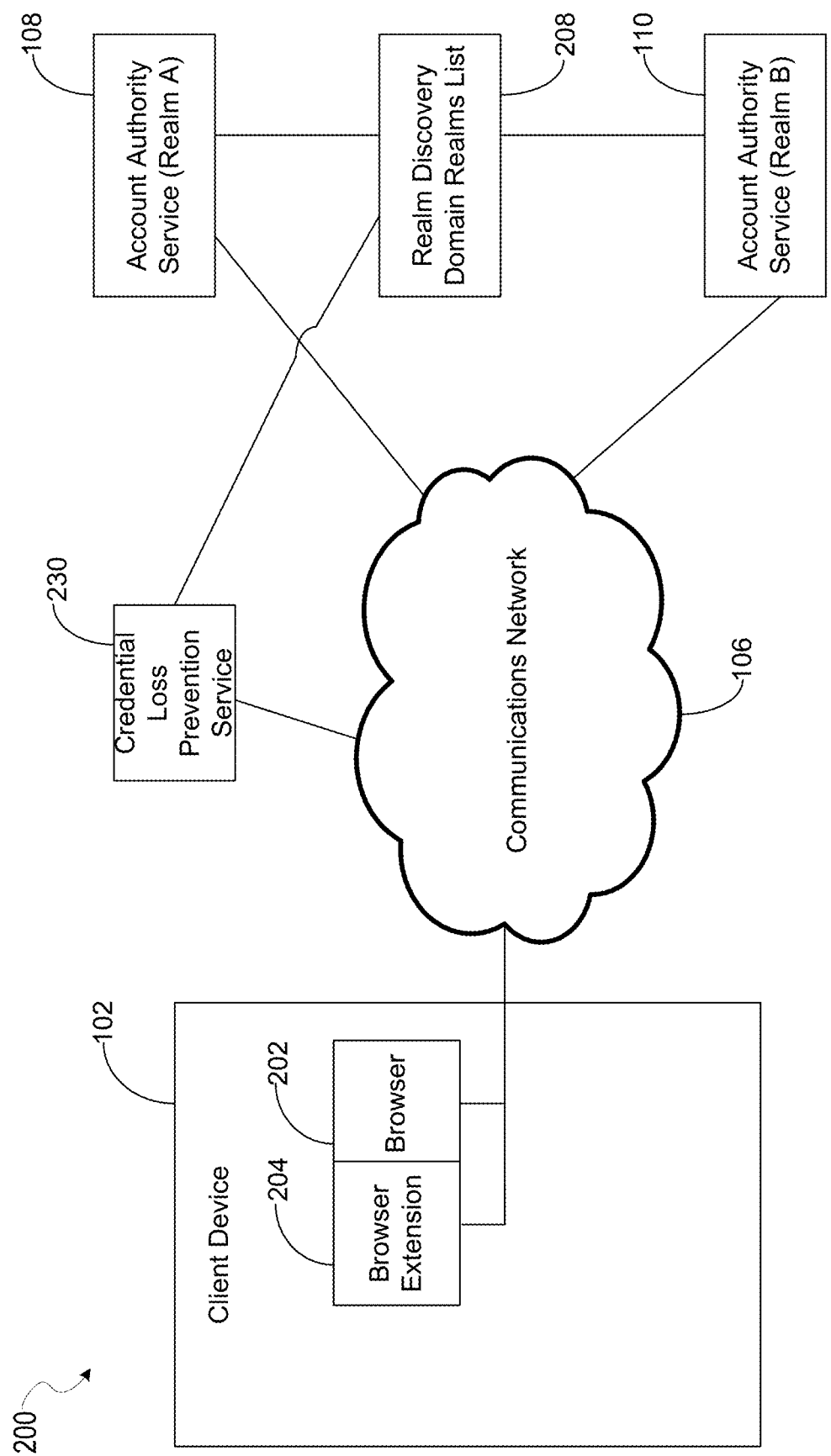
FIG. 2 shows an example system implementing one or more of the disclosed embodiments.

FIG. 2 shows an example system 200 that implements at least some of the disclosed embodiments. The client device 102 is shown in communication with the communications network 106 for communications with the account authority service 108 for a first realm or domain, shown as realm "A". The client device 102 is also in communication with the second account authority service 110 for a second realm "realm B." Each account authority service 108 and 110 has access to a realm discovery domain realms list 208 respectively. The realms list 208 includes a mapping of an account to specific realm information, such as a URL to the corresponding account's home realm account authority service.

The client device 102 may include a browser 202 that can be used to access network services in one or more realms. The browser 202 may be associated with a browser extension (e.g. a browser helper object, an Active X control, a Firefox extension, or other technologies) that may, in some embodiments, store realm information locally or via another realm list storage facility. Alternatively, the browser 202 can store realm information in its browser cookie cache (not shown). In some embodiments, no domain information may be stored locally by the browser and/or browser extension.

A login user interface received from an account authority service can be presented on a display of the client device 102, which may also transmit some or all of a set of account credentials back to the account authority service via the communications network 106.

When the credentials are transmitted to the account authority service, embodiments of the present disclosure may also capture information included in the login user interface and transmit the information to a credential loss prevention service 230. The credential loss prevention service 230 evaluates the information provided to the login user interface to determine whether the information presents a risk of compromising credentials associated with the realms or domains managed by the system 200. If a risk is detected, the credential loss prevention service 230 may initiate a variety of possible actions to mitigate against the detected risk, as explained further below.

Figure 3:
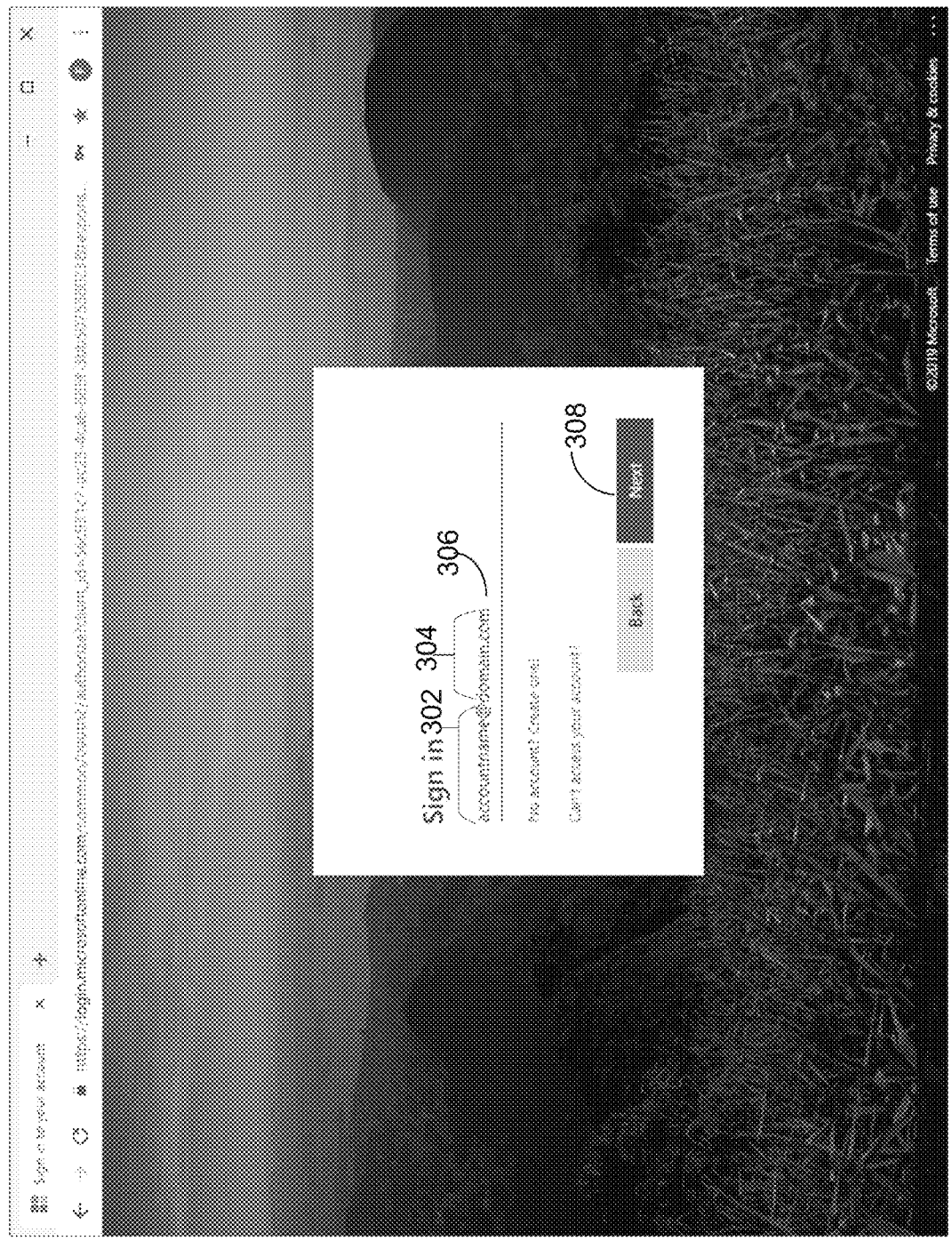
FIG. 3 shows an example of an authentication user interface in one or more of the disclosed embodiments.

FIG. 3 shows an example of an authentication user interface. The authentication user interface 300 may be displayed by the browser 202 discussed above with respect to FIG. 2. The browser extension 204 may also monitor, via an API provided by the browser, the authentication user interface 300 in order to obtain an account portion 302 and an authentication domain portion 304 of the authentication credential 306. After entry of the authentication credential 306, the "next" button 308 may be selected. Upon selection of the "next" button 308, the data included in the account portion 302 and/or authentication domain portion 304 may be provided to the browser extension 204 by the browser 202. The browser extension 204 may then perform additional processing on the data as described further below.

Figure 4:
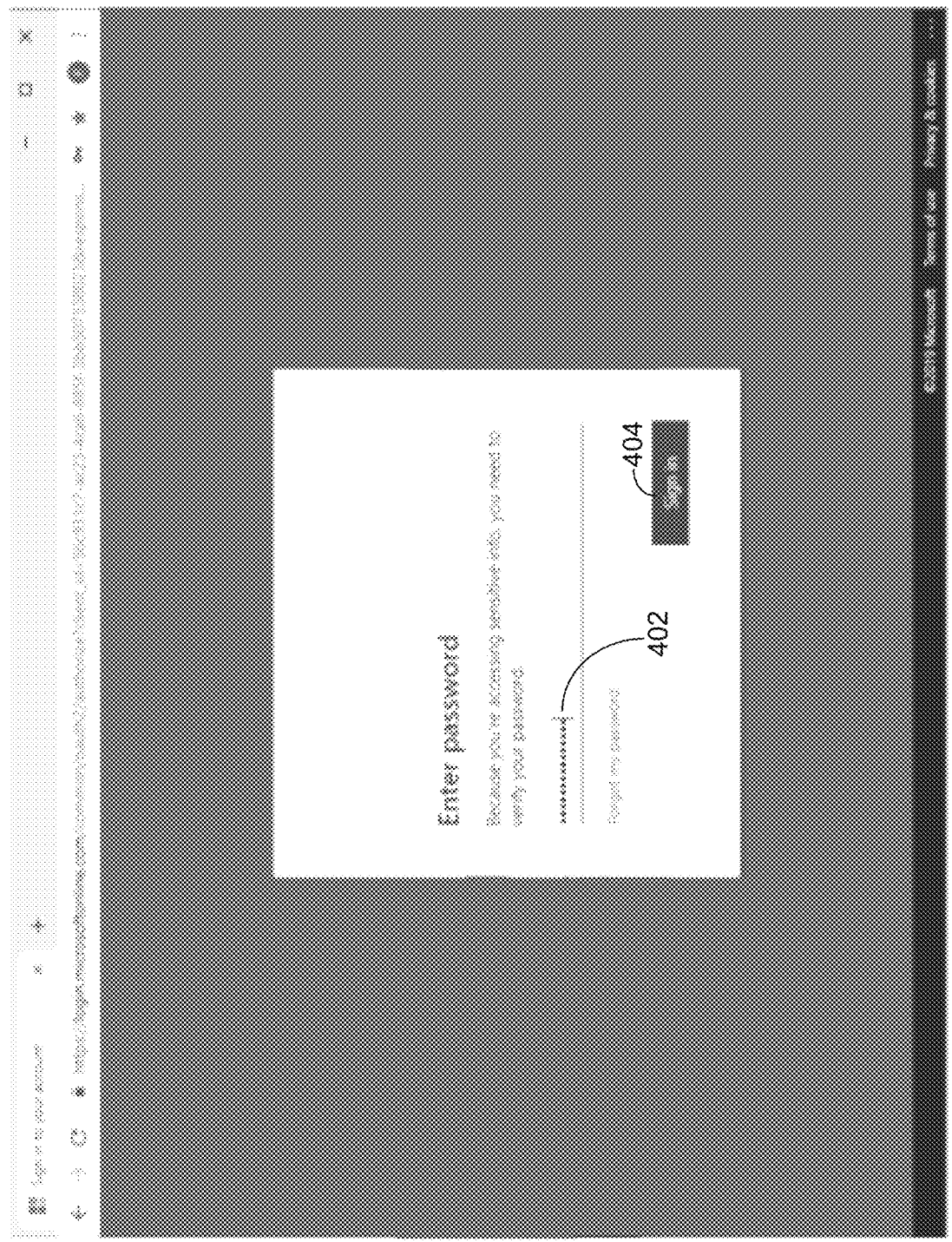
FIG. 4 shows an example of an authentication user interface in one or more of the disclosed embodiments.

FIG. 4 shows an example of an authentication user interface. The user interface 400 shown in FIG. 4 may be displayed by the browser 402. In some aspects, the browser extension 404 may monitor the user interface 400 in order to capture input provided to the user interface 400. As discussed above, in some aspects, the browser extension 404 may capture an authentication credential from the user interface 400 for use in implementation of the disclosed methods.

The authentication user interface 400 provides for entry of an authentication credential 402. In the illustrated user interface 400 of FIG. 4, the authentication credential is a password. The user interface 400 may be displayed in response to selection of the "next" button 308 of FIG. 3. Upon selection of the "sign in" button 404, a device displaying the user interface 400 may attempt an authentication based on the credential 402. Upon reception of a completion input to the user interface 400, such as the "sign in" button 404, the browser extension 404 may be configured to transmit a message including an authentication credential and an authentication domain for the authentication entered via the user interface 300 and/or the user interface 400. The message may be transmitted to a credential protection component, as discussed further below.

Figure 5:
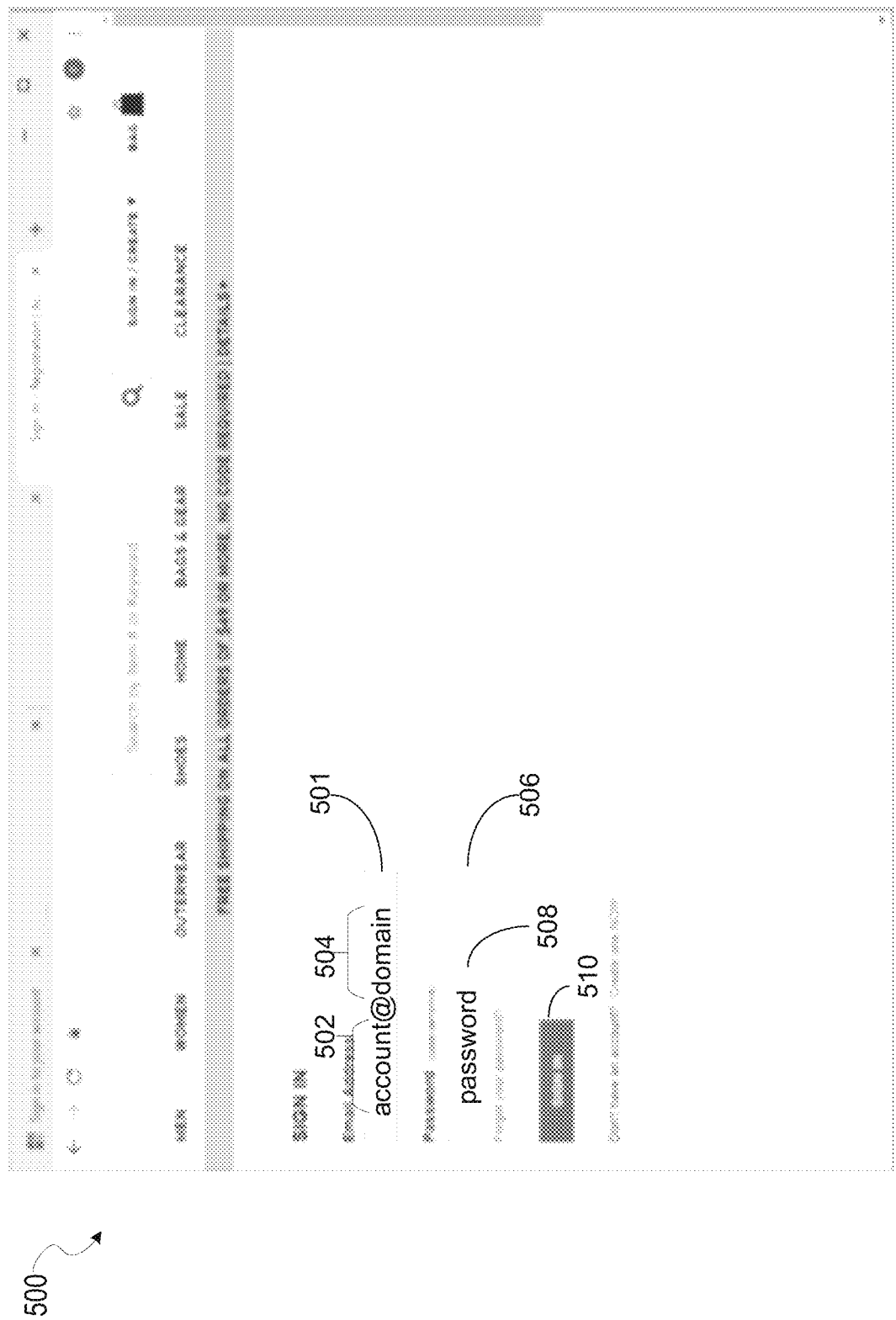
FIG. 5 shows another example of an authentication user interface in one or more of the disclosed embodiments.

FIG. 5 shows another example of an authentication user interface. The user interface 500 may be displayed via the browser 202. Unlike the two user interfaces 300 and 400 discussed above with respect to FIGS. 3 and 4 respectively, the user interface 500 is configured to accept input defining two authentication credentials on one user interface. As shown, the user interface 500 accepts input defining a first field 501 and a second field 506. The first field 501 includes input defining an account portion 502, which may form an authentication credential. The first field 501 also includes an authentication domain portion 504. The second field 506 may receive input defining an authentication credential, such as a password 508.

The browser extension 204 may also monitor input provided to the user interface 500 in order to obtain an authentication credential and/or an authentication domain. For example, via an API provided by the browser 202, the browser extension 204 may capture character or other input to the user interface 500, such as characters entered into the email address field 501 and/or the password field 506.

Upon selection of the "sign in" button 510, the user interface 500 may initiate an authentication. The browser extension 204 may also monitor the user interface 500 to detect entry of data into the fields 501 and 506, and also reception of a completion input, such as selection of the "sign in" button 510. Upon receiving the completion input, the extension may transmit a message indicating an authentication credential (e.g. 502 and/or 508), authentication domain (e.g. 504) to a credential protection component, as discussed in more detail below.

Figure 6:
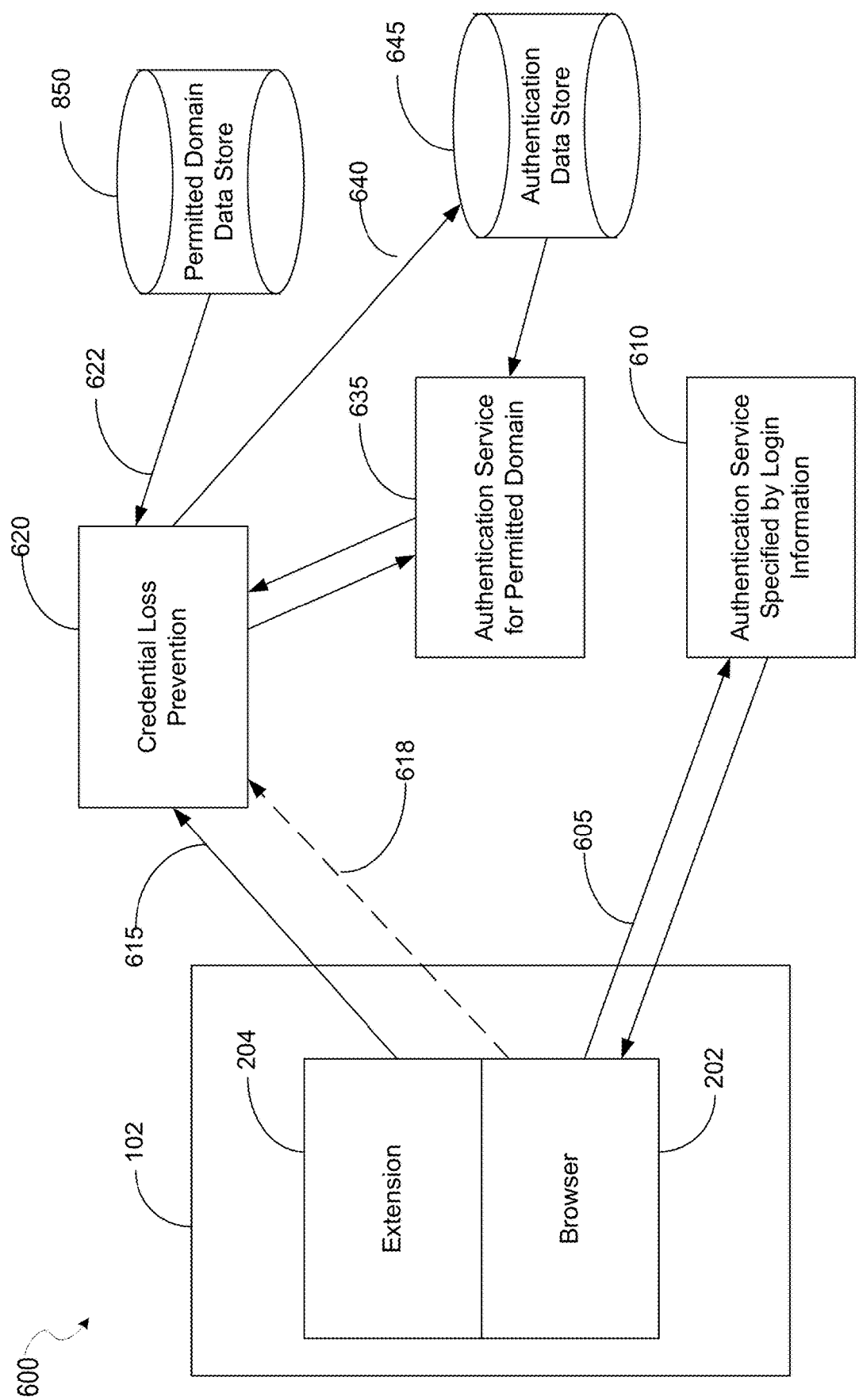
FIG. 6 shows data flows between components implemented in in one or more of the disclosed embodiments.

FIG. 6 shows data flows between components implemented in at least one of the disclosed embodiments. FIG. 6 shows the browser 202 and browser extension 204 from FIG. 2. As discussed above, the browser 202 may display an authentication login user interface on a display, such as any of the user interfaces 300, 400, or 500 discussed above. As a result, the browser 202 and/or browser extension 204 may receive an authentication credential as input. The authentication credential may include an account name (e.g. 302 or 502) and/or a password (e.g. or 402 or 508). Other authentication credentials are also contemplated, such as a signal from a biometric scan, smart card, or information card.

The login user interface also receives input defining an authentication domain for the authentication. In some cases, the input defining the authentication domain may define a realm of a federated authentication system. In some aspects, the input defining the authentication domain is integrated with the authentication credential. For example, as shown in the example user interface 300 discussed above, an input to the user interface 300 may be in the form of an email address, where characters to the left of the "@" sign define an account name (e.g. 302), which is an authentication credential in some aspects. Characters to the right of the "@" sign define an authentication domain (e.g. 304) in some aspects.

Upon receiving a completion input which may include an enter key input or a selection of a UI control indicating the browser is to initiate authentication (e.g. selection of the "next button 308, "sign in" button 404, or "sign in" button 510), the browser 202 sends an authentication request 605 to an authentication service 610 specified by the authentication domain 504.

The browser extension 204, as a result of its integration with the browser 202 via an integration API, has access to the input provided to the login user interface (e.g. 300, 400, and/or 500) described above. The browser extension 204 is configured to, upon detecting the completion input (e.g. 308, 404, 510) and/or the browser's transmission of the authentication request 605, generates a message 615 including the authentication credential and information defining the authentication domain. In some alternative aspects, the browser 202 may be configured to communicate directly with the credential loss component 620, without the need for the extension 204 to necessarily be involved. Thus, instead of the browser extension 204 generating the message 615, the browser 202 may generate the message 618. The messages 615 and 618 are largely synonymous as discussed throughout this disclosure, except for the module/component generating/transmitting the message (e.g. browser 202 generates and/or transmits message 618 while browser extension 204 generates and/or transmits message 615).

The message 615/618 is transmitted to a credential loss prevention component 620. The proper network address and port information for the credential loss prevention component 620 may be obtained by the extension 204 via domain name services (DNS) in some aspects. The credential loss prevention component 620 may run as part of the credential loss prevention service 230, discussed above with respect to FIG. 2.

Upon receiving the message 615/618 from the browser extension 204/browser 202, the credential loss prevention component 620 compares the authentication domain included in the message to permitted authentication domains 622 for the authentication credential (e.g. 302, 402, 502, 508). The permitted authentication domains 622 for the credential may include zero or more domains, and may be obtained from a permitted domain list data store 850, shown in FIG. 6. If the authentication domain included in the message 615 is not included in the permitted authentication domains 622 obtained from the permitted domain list data store 850, the credential loss prevention component 620 identifies a permitted authentication domain for the credential included in the message 615. The credential loss prevention component 620 then attempts to determine if the credential matches any credentials managed by the credential loss prevention component 620.

To determine whether the authentication credential matches, in some aspects, an attempt to authenticate with the credential is made. This may be performed using the authentication service 635 shown in FIG. 6. The authentication service 635 determines whether the credentials provided by the credential loss prevention component 620 match by comparing the credential to other credentials stored in an authentication data store 645. If the authentication succeeds, a match is confirmed. Alternatively, the credential loss prevention component 620 may compare the authentication credential to other credentials directly in the authentication data store 645.

If a match is detected, the credential loss component 620 may remediate an account identified by the authentication credential. Remediating the account may include disabling the account. For example, the credential loss prevention component 620 may write data 640 setting an indicator or flag in the authentication data store 645. Alternatively, the data 640 may be written to an account domain data store, not shown in FIG. 6 but discussed below with respect to FIG. 8. The flag or indicator indicates the account is locked, which prevents any further successful authentications for the account until an administrator has intervened to unlock the account and/or modify the authentication credentials for the account. Alternatively, remediating the account may include instantiating an event, for example, to an administrative account or an account logged into device 102.

Figure 7:
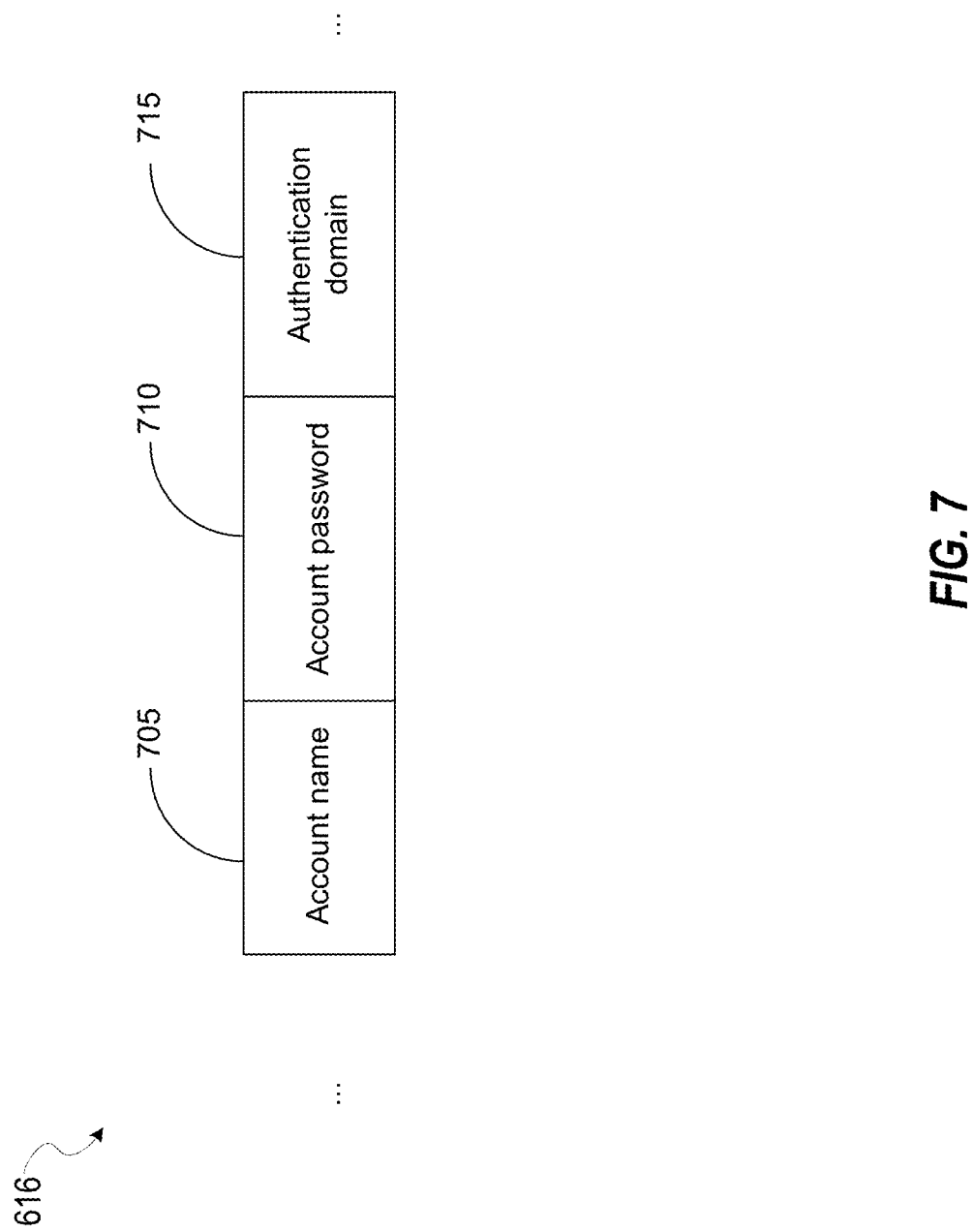
FIG. 7 shows an example message portion transmitted to the credential loss prevention component in one or more of the disclosed embodiments.

FIG. 7 shows an example message portion transmitted to the credential loss prevention component 620 in at least some of the disclosed embodiments. The message portion 616 may be included in the message 615 or the message 618 discussed above with respect to FIG. 6. The message portion 616 includes an account name field 705, account password field 710, and authentication domain field 715. The account name field 705 may carry or otherwise indicate an account name authentication credential. For example, the account name field 705 may carry the account name 302 or 502, discussed above with respect to FIGS. 3 and 5 respectively.

The account password field 710 may carry or otherwise indicate an account password authentication credential. For example, the account password field 710 may carry the password 402 or 508, discussed above with respect to FIGS. 4 and 5 respectively. The authentication domain field 715 may carry or otherwise indicate an authentication domain. For example, the authentication domain field 715 may carry the domain 304 or 504, discussed above with respect to FIGS. 3 and 5 respectively. In some aspects, a browser extension (e.g. 204) may transmit a message including the message portion 616 to a credential loss component (e.g. 620). The credential loss component 620 may be running within a cloud implementation or back-end server in some embodiments. Alternatively, in some aspects, the credential loss prevention component may run on the client device 102 itself.

Figure 8:
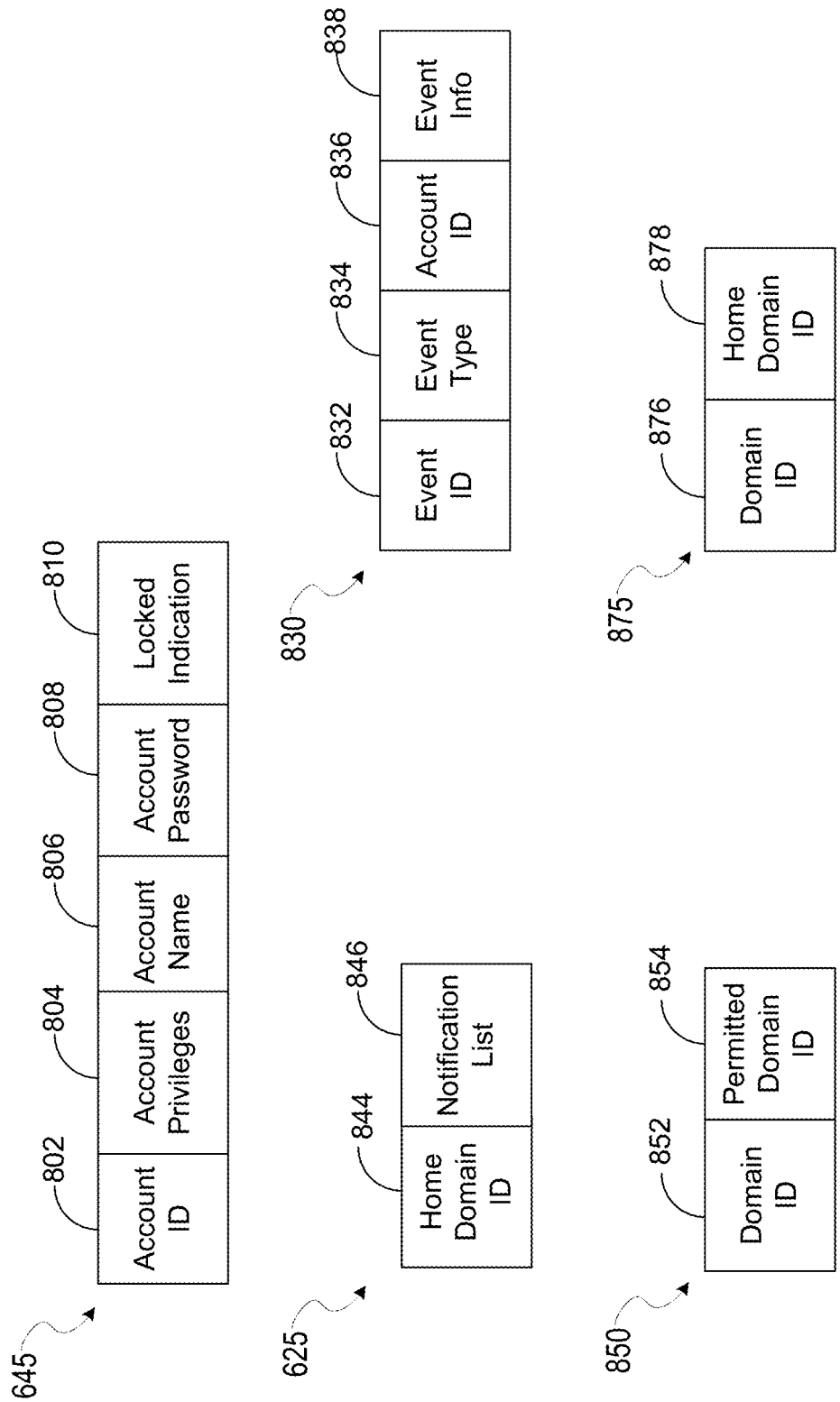
FIG. 8 shows example of data structures that may be implemented in one or more of the disclosed embodiments.

FIG. 8 shows example data structures that may be implemented in one or more of the disclosed embodiments. While the data structures of FIG. 8 are described as relational database tables, one of skill in the art would understand that the data structures could be implemented using a variety of different designs, including as linked lists, trees, an object oriented database, unstructured data store, or using any of the known data storage architectures.

FIG. 8 shows an authentication data store 645, account domain data store 625, an event data store 830 a permitted domain list data store 850, and a home domain data store 875. Access to one or more of the data stores discussed below with respect to FIG. 8 may be restricted. For example, access to one or more of these data stores may only be permitted by entities that have previously authenticated with one or more of the domains within an enterprise. This may prevent entities unassociated with the enterprise from determining security related parameters, such as which domains are available for authentication within the enterprise.

Each row of the authentication data store 645 includes an account identifier 802, account privileges field/column 804, account name field/column 806, an account password field/column 808, and a locked indication field/column 810. The account identifier 802 uniquely identifies a computer account. The account privileges field 804 stores or otherwise indicates privileges provided to the account identified by the account identifier field 802. For example, the account privileges field may indicate whether the account has administrative privileges or user privileges.

The account name field/column 806 carries/stores or otherwise indicates an account name authentication credential. The account name field 806 may store, for example, the account name 302 and/or the account name 502. The account password field/column 808 may store/carry or otherwise indicate an account password, such as for example the password 404 discussed above with respect to FIG. 4 or the password 508 discussed above with respect to FIG. 5. The locked indication 810 may store/carry or otherwise indicate whether the account identified by the account identifier 802 is available for use. In some aspects, upon detection of a risk to credentials associated with the account identified by 802, some embodiments of this disclosure may set the locked indication 810. When the account identified by account identifier 802 is authenticated, the authentication process may check the locked indication 810, and fail any authentication attempted while the locked indication 810 is set.

In some aspects, data stored in one or more of the fields/columns present in the authentication data store 645 may be stored in a modified or obfuscated form. For example, data stored in one or more of the fields/columns may be stored in a unhashed and/or a hashed form. In some aspects, the hashed form may be a base64 hash.

The domain data store 625 includes a home domain identifier field/column 844, and a notification list field 846. The home domain identifier field 844 identifies a home domain. The notification list field/column 846 stores or otherwise indicates a list of recipients of an event raised that identifies the home domain identified via 844. For example, if an exception condition occurs with respect to the home domain 844, the list of recipients identified in the notification list field 846 are notified of the event. The notification list 846 may indicate not only the list of recipients, but a priority order for each recipient of messaging technologies to be employed in notifying the recipients. For example, for a first recipient, the notification list field 846 may indicate the notification is sent via email first and then text message, whereas for a second recipient, the notification is sent via text first and then email (unless an acknowledgment of the notification is received in some aspects). The notification may be accomplished via a variety of technologies. For example, email, text message, posting to a particular social network feed may be used for notification. In addition, API messaging such as REST/webhooks may be used to perform the notification. Notification addresses stored in the notification list 846 would of course be appropriate for the type of notification. Thus, the notification list 846 may store email address, text message addresses/phone number, notification URLs, or other address types as needed to effect a particular notification.

The permitted domain list data store 850 includes a domain identifier 852 and a permitted domain identifier 854. The permitted domain list data store 850 identifies trust relationships granted to a second domain (e.g. 854) by a first domain (e.g. 852). The permitted domain list data store 850 may be used to identify a permitted domain for a credential, as described below.

The event data store 830 includes an event identifier field/column 832, event type field/column 834, account identifier field/column 836, and event information field/column 838. The event identifier field 832 uniquely identifies an event. The event type field 834 identifies a type of the event. For example, the event type may indicate why the event was instantiated. Some examples may include disk space full, memory full, uniform resource locator (URL) access blocked, authentication against an unpermitted domain with valid authentication credentials, among others. The account identifier 836 indicates an account instantiating the event. The account identifier 836 may be cross referenced with the account identifier 802 and/or the account identifier 842. The event information field/column 838 may indicate additional information specific to the event type 834. For example, for events where valid credentials have been used against an unpermitted domain, the event info field 838 may indicate the unpermitted domain.

The home domain data store 875 provides a mapping from a domain identifier 876 to a home domain identifier 878.

Figure 9:
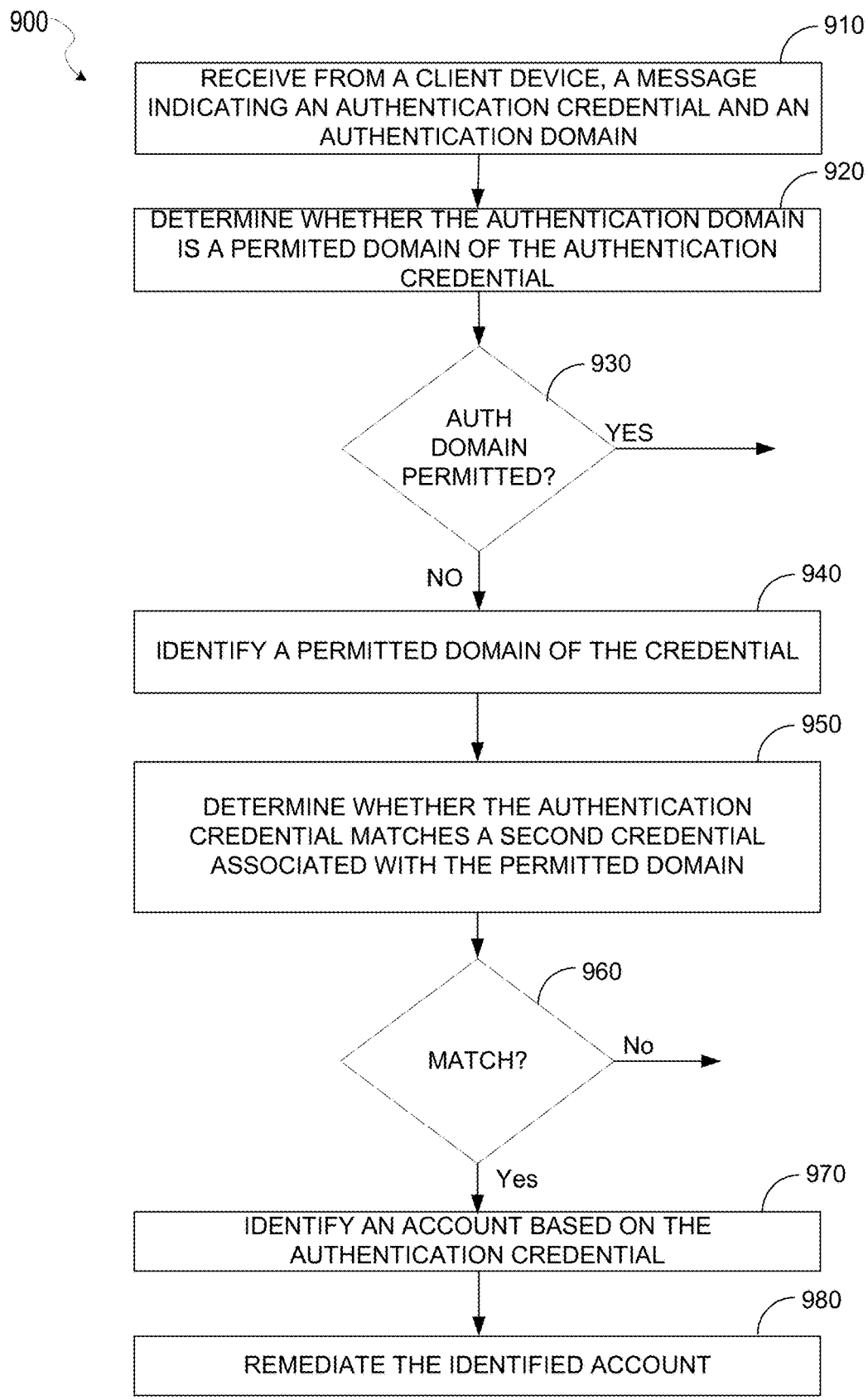
FIG. 9 is a flowchart of a method for protecting authentication credentials in one or more of the disclosed embodiments.

FIG. 9 is a flowchart of a method for protecting authentication credentials. In some aspects, one or more of the functions discussed below with respect to FIG. 9 may be performed by hardware processing circuitry. For example, instructions stored in one or more electronic hardware memories may, when executed, configure the hardware processing circuitry to perform one or more of the functions discussed below. In some aspects, the instructions that configure the hardware processing circuitry may be included in the credential loss prevention component 620, discussed above with respect to FIG. 6. In some aspects, the hardware processing circuitry may be the processor 1002, discussed below with respect to FIG. 10, and the hardware memory may be the memory 1004, also discussed below with respect to FIG. 10. The instructions may be the instructions 1024, also discussed below with respect to FIG. 10.

In operation 910, a message (e.g. message 615) is received from a client device. The message indicates an authentication credential and an authentication domain. In some aspects, the authentication credential and authentication domain may alternatively be received via an API function/method call. The authentication credential may include one or more of an account name, an account domain, and/or an account password. For example, the authentication credential may, in some aspects, take the form of an email address. Thus, the account name in this example may be a portion of the email address to the left of the "@" sign, while the account domain is a portion of the credential subsequent to the "@" sign.

Operation 920 determines whether the authentication domain is a permitted authentication domain of the authentication credential. For example, operation 920 may first extract an account domain from the credential. As discussed above, in at least some aspects, the account domain is included in an authentication string, such as an email address, which may be passed in the message 615 as an authentication credential. Thus, operation 920 may parse the authentication credential to segment the authentication credential into an account domain portion (e.g. after the "@" sign) and an account name portion (e.g. before the "@" sign).

The account domain portion may then be used to obtain a list of permitted domains for the account, for example, by searching a permitted domain list data store (e.g. 850) to identify zero or more permitted domains for the account domain. These zero or more permitted domains are then compared to the authentication domain to determine if the authentication domain is a permitted domain.

In some aspects, identifying whether the authentication domain is a permitted domain of the account credential includes identifying a home domain of a domain included in the account credential (e.g. an "account domain"). As discussed previously, the account domain may be specified in a credential after an "@" sign in the credential. The home domain may be identified in some aspects via a home domain data store that maps domains to home domains (e.g. 875). Other domains having a trust relationship with the home domain may then be identified via a permitted domain list data store (e.g. 850). If the authentication domain is the home domain or is included in the set of domains having a trust relationship with the home domain, then the authentication domain is a permitted domain of the account credential. Otherwise, the authentication domain is an unpermitted domain of the account credential. Identifying a permitted domain of the account credential operates in a similar manner. An account domain is obtained from the account credential. For example, the account credential may be segmented into a domain portion and another portion. A home domain of the account credential is then identified via a mapping from the account domain to the home domain. Such a mapping may be stored in a home domain data store (e.g. 875) in some aspects. From the home domain, domains having a trust relationship with the home domain may be identified via a mapping from the home domain to other trusted domains. For example, as stored in the permitted domain list data store 850. Any trusted domain may be considered a permitted domain of the authentication credential.

If the domain is permitted, decision operation 930 takes the yes branch and processing continues. If the authentication domain is not permitted, decision operation 930 takes the no branch and process 900 moves to operation 940, which identifies a permitted authentication domain of the credential. In some aspects, operation 930 may search a permitted domain list datastore (e.g. 850) and an identification of the permitted domain is then based on the search. For example, in some aspects, permitted domain list data store 850 is searched to identify a domain id field 852 corresponding to the account domain specified in the authentication credential. If found, the corresponding permitted domain id 854 identifies a permitted domain.

Operation 950 determine whether the credential matches a second credential associated with the permitted authentication domain. In some aspects, the match is determined by authenticating against the permitted domain using the authentication credential. In some aspects, this authentication may rely on authentication data store 645. If the authentication succeeds, a match is detected. In some aspects, an obfuscated version of the authentication credential (which may be included in the message received in operation 910), is compared to similarly obfuscated version of credentials stored in the authentication datastore 645. In some aspects, the credential may be obfuscated via hashing, such as a base64 hashing.

If a match is not detected, decision operation 960 takes the no branch and processing continues. If a match is detected, decision operation 960 takes the yes branch and process 900 moves to operation 970, which identifies an account based on the authentication credential. In some aspects, the authentication credential is an account name. Thus, in these aspects, operation 970 may search an authentication data store (e.g. 645). An identification of the account is then based on a result of the search. In some other aspects, the authentication credential may be in the form of an email address. In these aspects, the account may be identified by segmenting the authentication credential into an account portion and at least one other portion. Once the account portion is obtained, the authentication datastore (e.g. 645) may be searched. An identification of the account is then based on a result of the search.

In operation 980, the identified account is remediated. In some aspects, remediating the account includes raising an event identifying the account. The event may indicate that matching or valid authentication credentials were used to authenticate against an unpermitted domain. In some aspects, the event may be instantiated to indicate the unpermitted domain and/or the account. In some aspects, remediating the account includes disabling the account. For example, operation 980 may set a disable flag or indicator in an account domain database (e.g. 645, field 810 for example) that prevent any future authentications against the account until an administrator is able to review the account, and possibly change authentication credentials of the account and/or access privileges of the account. In some aspects, the event may be transmitted in an email message, text message, or other messaging technology to a distribution list indicated for the identified account. In some aspects, a remediation playbook may be associated with the identified account, and remediating the account includes executing the remediation playbook.

Some aspects of process 900 determine whether a reputation of the authentication domain meets a criterion. For example, these aspects may interface with a reputation system, which maintains data indicating reputation of a plurality of different domains. The reputation data may indicate a level of trust associated with the authentication domain. For example, well known domains with established track records of reliable and lawful activity may have a generally higher reputation than less known domains or domains having a history of unreliable or unlawful activity. Reputation systems for network entities are generally known. These aspects may also interface with phishing detection and/or tracking systems that maintain databases of network entities having evidence of involvement in phishing activities. For example, if the reputation of the authentication domain is below a threshold or meets a criterion indicating the reputation is otherwise not particularly good, these aspects may interface with the phishing detection and/or tracking systems, for example, by transmitting a message to this phishing detection and/or tracking system, with the message indicating the authentication domain. Upon receiving the message, the phishing detection and/or tracking system may record the authentication domain in a data store. The information regarding the authentication domain may then be distributed to other users of the phishing detection and/or tracking system as appropriate.

In some aspects, distribution of the event to one or more recipients may be provided by a notification list associated with the account or with a home domain of the account. For example, as illustrated in the example of FIG. 8, the notification list field 846 may be associated with a home domain 844 for an account 802, and provide a list of one or more recipients for event notifications, and/or message technologies to use for the notifications (e.g. email, text, webhook, etc).

Figure 10:
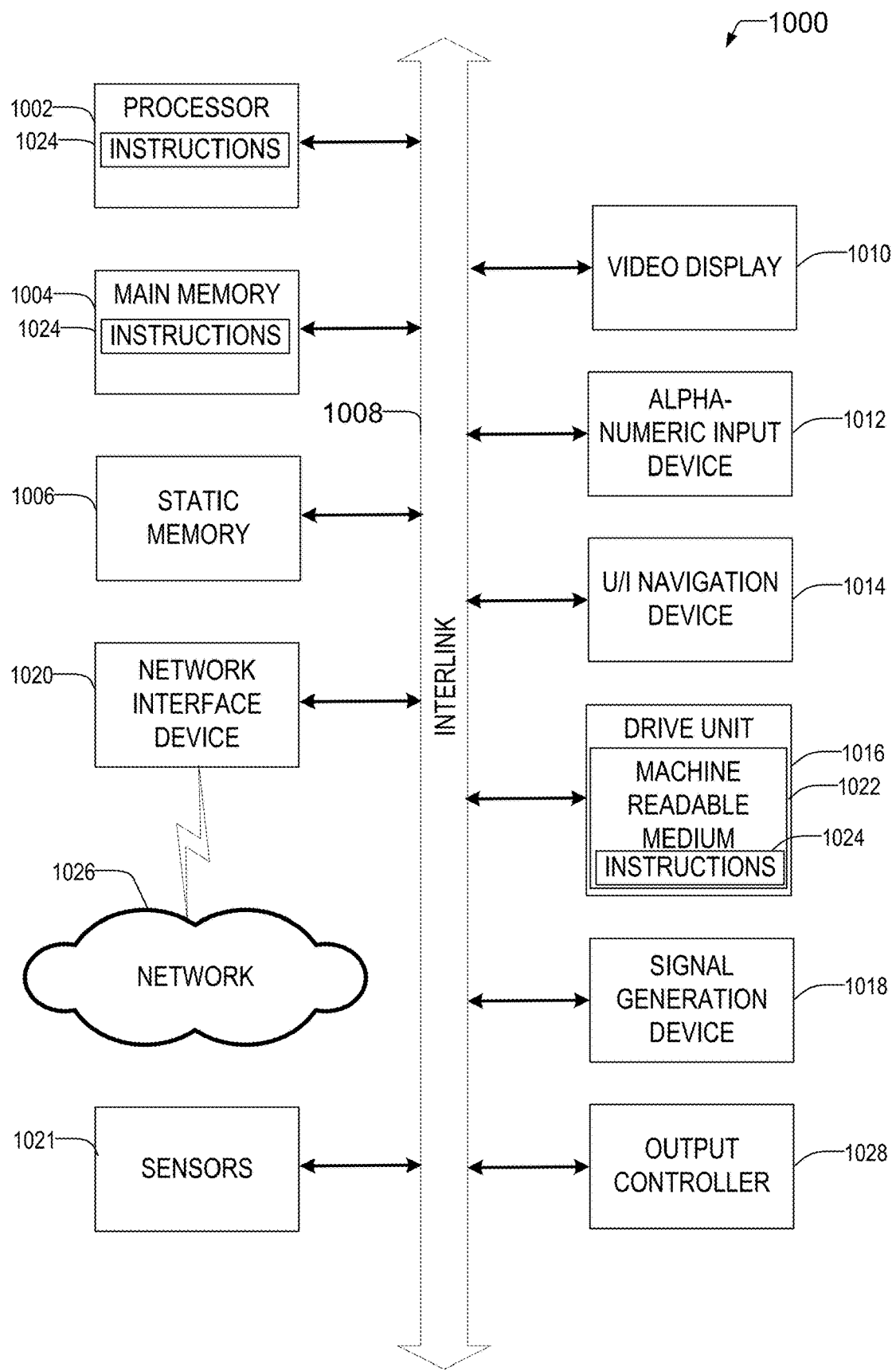
FIG. 10 illustrates a block diagram of an example machine upon which any one or more of the techniques (e.g., methodologies) discussed herein may be performed in one or more of the disclosed embodiments.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1000 may perform one or more of the processes described above with respect to FIGS. 1-9. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method performed via hardware processing circuitry, comprising: receiving, from a client device, a message indicating an authentication credential and an authentication domain; determining that the authentication domain is an unpermitted authentication domain of the authentication credential; identifying a permitted authentication domain of the authentication credential; determining the authentication credential matches a credential associated with the permitted authentication domain; identifying, based on the authentication credential, an account; and instantiating an event indicating the identified account.

In Example 2, the subject matter of Example 1 optionally includes wherein the authentication credential includes an account name or an account password.

In Example 3, the subject matter of any one or more of Examples 1-2 optionally include wherein determining that the authentication domain is an unpermitted authentication domain comprises: identifying an account domain based on the authentication credential; searching a home domain data store based on the account domain; identifying a home domain of the account domain based on the search; searching a permitted domain list data store based on the home domain; and determining the authentication domain is an unpermitted authentication domain based on the search of the permitted domain list data store.

In Example 4, the subject matter of any one or more of Examples 1-3 optionally include wherein identifying the permitted authentication domain of the authentication credential comprises: identifying an account domain based on the authentication credential; searching a home domain data store based on the account domain; identifying a home domain of the account domain based on the search; searching a permitted domain list data store based on the home domain; and identifying the permitted authentication domain of the authentication credential based on the search of the permitted domain list data store.

In Example 5, the subject matter of any one or more of Examples 1-4 optionally include wherein identifying a permitted authentication domain of the authentication credential comprises: segmenting the authentication credential into a domain name portion and another portion; searching a domain list database based on the domain name portion; and identifying the permitted authentication domain based on the search.

In Example 6, the subject matter of any one or more of Examples 1-5 optionally include wherein the determining of the match comprises comparing the authentication credential to an obfuscated version of the credential associated with the permitted authentication domain, wherein the match is based on the comparing.

In Example 7, the subject matter of Example 6 optionally includes wherein the authentication credential is an obfuscated password.

In Example 8, the subject matter of Example 7 optionally includes wherein the obfuscated password is a hashed password.

In Example 9, the subject matter of any one or more of Examples 1-8 optionally include wherein the determining of the match comprises successfully authenticating the authentication credential against the permitted domain, wherein the match is determined based on the successful authentication.

In Example 10, the subject matter of any one or more of Examples 1-9 optionally include disabling the identified account.

In Example 11, the subject matter of any one or more of Examples 1-10 optionally include executing a remediation playbook of the identified account.

In Example 12, the subject matter of any one or more of Examples 1-11 optionally include wherein the event is instantiated to further indicate the authentication domain is an unpermitted domain of the authentication credential.

In Example 13, the subject matter of Example 12 optionally includes wherein the event is instantiated to further indicate the authentication credential matches the credential associated with the permitted authentication domain.

In Example 14, the subject matter of any one or more of Examples 1-13 optionally include determining a reputation of the authentication domain meets a criterion; and transmitting a second message indicating the authentication domain to a server, the server configured to conditionally include the domain in a phishing database in response to the second message.

In Example 15, the subject matter of any one or more of Examples 1-14 optionally include wherein the message is received from a browser or a browser extension running on the client device.

In Example 16, the subject matter of Example 15 optionally includes wherein instantiating the event comprises notifying the browser or the browser extension of the event.

Example 17 is a system, comprising: hardware processing circuitry; one or more hardware memories storing instructions that when executed, configure the hardware processing circuitry to perform operations, the operations comprising: receiving, from a client device, a message indicating an authentication credential and an authentication domain; determining that the authentication domain is an unpermitted authentication domain of the authentication credential; identifying a permitted authentication domain of the authentication credential, determining the authentication credential matches a credential associated with the permitted authentication domain, and identifying, based on the authentication credential, an account; and instantiating an event indicating the identified account.

In Example 18, the subject matter of Example 17 optionally includes wherein the authentication credential includes an account name or an account password.

In Example 19, the subject matter of any one or more of Examples 17-18 optionally include wherein determining that the authentication domain is an unpermitted authentication domain comprises: identifying an account domain based on the authentication credential; searching a home domain data store based on the account domain; identifying a home domain of the account domain based on the search; searching a permitted domain list data store based on the home domain; and determining the authentication domain is an unpermitted authentication domain based on the search of the permitted domain list data store.

In Example 20, the subject matter of any one or more of Examples 17-19 optionally include wherein identifying the permitted authentication domain of the authentication credential comprises: identifying an account domain based on the authentication credential; searching a home domain data store based on the account domain; identifying a home domain of the account domain based on the search; searching a permitted domain list data store based on the home domain; and identifying the permitted authentication domain of the authentication credential based on the search of the permitted domain list data store.

In Example 21, the subject matter of any one or more of Examples 17-20 optionally include wherein identifying a permitted authentication domain of the authentication credential comprises: segmenting the authentication credential into a domain name portion and another portion; searching a domain list database based on the domain name portion; and identifying the permitted authentication domain based on the search.

In Example 22, the subject matter of any one or more of Examples 17-21 optionally include wherein the determining of the match comprises comparing the authentication credential to an obfuscated version of the credential associated with the permitted authentication domain, wherein the match is based on the comparing.

In Example 23, the subject matter of Example 22 optionally includes wherein the authentication credential is an obfuscated password.

In Example 24, the subject matter of Example 23 optionally includes wherein the obfuscated password is a hashed password.

In Example 25, the subject matter of any one or more of Examples 17-24 optionally include wherein the determining of the match comprises successfully authenticating the authentication credential against the permitted domain, wherein the match is determined based on the successful authentication.

In Example 26, the subject matter of any one or more of Examples 17-25 optionally include the operations further comprising disabling the identified account.

In Example 27, the subject matter of any one or more of Examples 17-26 optionally include the operations further comprising executing a remediation playbook of the identified account.

In Example 28, the subject matter of any one or more of Examples 17-27 optionally include the operations wherein the event is instantiated to further indicate the authentication domain is an unpermitted domain of the authentication credential.

In Example 29, the subject matter of Example 28 optionally includes the operations wherein the event is instantiated to further indicate the authentication credential matches the credential associated with the permitted authentication domain.

In Example 30, the subject matter of any one or more of Examples 17-29 optionally include the operations further comprising: determining a reputation of the authentication domain meets a criterion; and transmitting a second message indicating the authentication domain to a server, the server configured to conditionally include the domain in a phishing database in response to the second message.

In Example 31, the subject matter of any one or more of Examples 17-30 optionally include wherein the message is received from a browser or a browser extension running on the client device.

In Example 32, the subject matter of Example 31 optionally includes wherein instantiating the event comprises notifying the browser or the browser extension of the event.

Example 33 is a non-transitory computer readable storage medium comprising instructions that when executed by hardware processing circuitry configure the hardware processing circuitry to perform operations, the operations comprising: receiving, from a client device, a message indicating an authentication credential and an authentication domain; determining that the authentication domain is an unpermitted authentication domain of the authentication credential; identifying a permitted authentication domain of the authentication credential, determining the authentication credential matches a credential associated with the permitted authentication domain, and identifying, based on the authentication credential, an account; and instantiating an event indicating the identified account.

In Example 34, the subject matter of Example 33 optionally includes wherein the authentication credential includes an account name or an account password.

In Example 35, the subject matter of any one or more of Examples 33-34 optionally include wherein determining that the authentication domain is an unpermitted authentication domain comprises: identifying an account domain based on the authentication credential; searching a home domain data store based on the account domain; identifying a home domain of the account domain based on the search; searching a permitted domain list data store based on the home domain; and determining the authentication domain is an unpermitted authentication domain based on the search of the permitted domain list data store.

In Example 36, the subject matter of any one or more of Examples 33-35 optionally include wherein identifying the permitted authentication domain of the authentication credential comprises: identifying an account domain based on the authentication credential; searching a home domain data store based on the account domain; identifying a home domain of the account domain based on the search; searching a permitted domain list data store based on the home domain; and identifying the permitted authentication domain of the authentication credential based on the search of the permitted domain list data store.

In Example 37, the subject matter of any one or more of Examples 33-36 optionally include wherein identifying a permitted authentication domain of the authentication credential comprises: segmenting the authentication credential into a domain name portion and another portion; searching a domain list database based on the account name portion; and identifying the permitted authentication domain based on the search.

In Example 38, the subject matter of any one or more of Examples 33-37 optionally include wherein the determining of the match comprises comparing the authentication credential to an obfuscated version of the credential associated with the permitted authentication domain, wherein the match is based on the comparing.

In Example 39, the subject matter of Example 38 optionally includes wherein the authentication credential is an obfuscated password.

In Example 40, the subject matter of Example 39 optionally includes wherein the obfuscated password is a hashed password.

In Example 41, the subject matter of any one or more of Examples 33-40 optionally include wherein the determining of the match comprises successfully authenticating the authentication credential against the permitted domain, wherein the match is determined based on the successful authentication.

In Example 42, the subject matter of any one or more of Examples 33-41 optionally include the operations further comprising disabling the identified account.

In Example 43, the subject matter of any one or more of Examples 33-42 optionally include the operations further comprising executing a remediation playbook of the identified account.

In Example 44, the subject matter of any one or more of Examples 33-43 optionally include the operations further comprising instantiating the event to further indicate the authentication domain is an unpermitted domain of the authentication credential.

In Example 45, the subject matter of Example 44 optionally includes the operations further comprising instantiating the event to further indicate the authentication credential matches the credential associated with the permitted authentication domain.

In Example 46, the subject matter of any one or more of Examples 33-45 optionally include the operations further comprising: determining a reputation of the authentication domain meets a criterion; and transmitting a second message indicating the authentication domain to a server, the server configured to conditionally include the domain in a phishing database in response to the second message.

In Example 47, the subject matter of any one or more of Examples 33-46 optionally include wherein the message is received from a browser or a browser extension running on the client device.

In Example 48, the subject matter of Example 47 optionally includes wherein instantiating the event comprises notifying the browser or the browser extension of the event.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A method performed via hardware processing circuitry, comprising:
   receiving, from a client device, a message indicating an authentication credential and an authentication domain, the authentication credential supplied with a login, by the client device, to an authentication service indicated by the authentication domain;
   determining that the authentication domain is an unpermitted authentication domain of the authentication credential;
   identifying a permitted authentication domain of the authentication credential;
   determining whether the authentication credential supplied with the login to an authentication service indicated by the unpermitted authentication domain matches a credential associated with the permitted authentication domain;
   identifying, based on the authentication credential matching the credential associated with the permitted authentication domain, an account accessible via the authentication credential supplied with the login; and
   instantiating an event indicating the identified account in response to the authentication credential supplied with the login to the authentication service indicated by the unpermitted authentication domain matching a credential associated with the permitted authentication domain.

2. The method of claim 1, wherein determining that the authentication domain is an unpermitted authentication domain comprises:
   identifying an account domain based on the authentication credential;
   searching a home domain data store based on the account domain;
   identifying a home domain of the account domain based on the search;
   searching a permitted domain list data store based on the home domain; and
   determining the authentication domain is an unpermitted authentication domain based on the search of the permitted domain list data store.

3. The method of claim 1, wherein identifying the permitted authentication domain of the authentication credential comprises:
   identifying an account domain based on the authentication credential;
   searching a home domain data store based on the account domain;
   identifying a home domain of the account domain based on the search;
   searching a permitted domain list data store based on the home domain; and
   identifying the permitted authentication domain of the authentication credential based on the search of the permitted domain list data store.

4. The method of claim 1, wherein identifying a permitted authentication domain of the authentication credential comprises:
   segmenting the authentication credential into a domain name portion and another portion;
   searching a domain list database based on the domain name portion; and
   identifying the permitted authentication domain based on the search.

5. A non-transitory computer readable storage medium comprising instructions that when executed by hardware processing circuitry configure the hardware processing circuitry to perform operations, the operations comprising:
   receiving, from a client device, a message indicating an authentication credential and an authentication domain, the authentication credential supplied with a login, by the client device, to an authentication service indicated by the authentication domain;
   determining that the authentication domain supplied with the login is an unpermitted authentication domain of the authentication credential;
   identifying a permitted authentication domain of the authentication credential,
   determining the authentication credential supplied with the login to an authentication service indicated by the unpermitted authentication domain matches a credential associated with the permitted authentication domain;

identifying, based on the authentication credential matching the credential associated with the permitted authentication domain, an account accessible via the authentication credential supplied with the login; and instantiating an event indicating the identified account in response to the authentication credential supplied with the login to the authentication service indicated by the unpermitted authentication domain matching a credential associated with the permitted authentication domain.

6. The non-transitory computer readable storage medium of claim 5, wherein the authentication credential includes an account name or an account password.

7. The non-transitory computer readable storage medium of claim 6, wherein the determining whether the authentication credential supplied with the login to the unpermitted authentication domain matches a credential associated with the permitted authentication domain verifies whether the account name and password provides for a successful login to the permitted authentication domain, and the operations further comprise disabling an account identified by the account name in response to the match.

8. The non-transitory computer readable storage medium of claim 7, the operations further comprising:

receiving, from the client device, a second message indicating a second account name and a second password and a second authentication domain, the second account name, the second password and the second authentication domain supplied with a second login, by the client device, to a second authentication authority;

determining that the second authentication domain supplied with the second login is an unpermitted authentication domain;

determining the second account name and second password, do not match a credential associated with the permitted authentication domain; and avoiding, based on the second account name and second password not matching a credential associated with the permitted authentication domain, a remedial action relating to the determining that the second authentication domain supplied with the second login is an unpermitted authentication domain.

9. The non-transitory computer readable storage medium of claim 5, wherein determining that the authentication domain is an unpermitted authentication domain comprises:

identifying an account domain based on the authentication credential;

searching a home domain data store based on the account domain;

identifying a home domain of the account domain based on the search;

searching a permitted domain list data store based on the home domain; and determining the authentication domain is an unpermitted authentication domain based on the search of the permitted domain list data store.

10. The non-transitory computer readable storage medium of claim 5, wherein identifying the permitted authentication domain of the authentication credential comprises:

identifying an account domain based on the authentication credential;

searching a home domain data store based on the account domain;

identifying a home domain of the account domain based on the search;

searching a permitted domain list data store based on the home domain; and identifying the permitted authentication domain of the authentication credential based on the search of the permitted domain list data store.

11. The non-transitory computer readable storage medium of claim 5, wherein identifying a permitted authentication domain of the authentication credential comprises:

segmenting the authentication credential into a domain name portion and another portion;

searching a domain list database based on the domain name portion; and identifying the permitted authentication domain based on the search.

12. The non-transitory computer readable storage medium of claim 5, wherein the determining of the match comprises comparing the authentication credential to an obfuscated version of the credential associated with the permitted authentication domain, wherein the match is based on the comparing.

13. The non-transitory computer readable storage medium of claim 12, wherein the authentication credential is an obfuscated password.

14. The non-transitory computer readable storage medium of claim 5, wherein the determining of the match comprises successfully authenticating the authentication credential against the permitted domain, wherein the match is determined based on the successful authentication.

15. The non-transitory computer readable storage medium of claim 5, the operations further comprising disabling the identified account.

16. The non-transitory computer readable storage medium of claim 5, the operations further comprising executing a remediation playbook of the identified account.

17. The non-transitory computer readable storage medium of claim 5, the operations further comprising instantiating the event to further indicate the authentication domain is an unpermitted domain of the authentication credential.

18. The non-transitory computer readable storage medium of claim 17, the operations further comprising instantiating the event to further indicate the authentication credential matches the credential associated with the permitted authentication domain.

19. The non-transitory computer readable storage medium of claim 5, wherein the message is received from a browser or a browser extension running on the client device and instantiating the event comprises notifying the browser or the browser extension of the event.

20. A system, comprising:

hardware processing circuitry;

one or more hardware memories storing instructions that when executed configure the hardware processing circuitry to perform operations comprising:

receiving, from a client device, a message indicating an authentication credential and an authentication domain, the authentication credential supplied with a login, by the client device, to an authentication service indicated by the authentication domain;

determining that the authentication domain is an unpermitted authentication domain of the authentication credential;

identifying a permitted authentication domain of the authentication credential;

determining the authentication credential supplied with the login to an authentication service indicated by the unpermitted authentication domain matches a credential associated with the permitted authentication domain;

identifying, based on the authentication credential matching the credential associated with the permitted authentication domain, an account accessible via the authentication credential supplied with the login; and instantiating an event indicating the identified account in response to the authentication credential supplied with the login to the authentication service indicated by the unpermitted authentication domain matching a credential associated with the permitted authentication domain.

\* \* \* \* \*